United States Patent [19]
Hoogland et al.

[11] Patent Number: 5,221,300
[45] Date of Patent: Jun. 22, 1993

[54] DUST SEPARATOR AND FILTER SUITABLE FOR USE IN SUCH A DUST SEPARATOR

[75] Inventors: Hans Hoogland; Jan H. Benedictus, both of Drachten, Netherlands

[73] Assignee: U.S. Philips Corp., New York, N.Y.

[21] Appl. No.: 932,838

[22] Filed: Aug. 20, 1992

[30] Foreign Application Priority Data

Sep. 9, 1991 [EP] European Pat. Off. ........ 91202289.4

[51] Int. Cl.⁵ .............................................. B61D 53/06
[52] U.S. Cl. ........................................ 55/316; 55/337; 55/344; 55/345; 55/398; 55/401; 55/521
[58] Field of Search ................. 55/316, 321, 322, 323, 55/337, 344, 345, 398, 401, 497, 521, 498

[56] References Cited
U.S. PATENT DOCUMENTS 3,320,727  5/1967  Farley et al. .......................... 55/337
4,289,513  9/1981  Brownhill et al. ................. 55/316 X
4,388,086  6/1983  Bauer ................................ 55/316 X
4,840,645  6/1989  Woodworth et al. ............ 55/401 X

FOREIGN PATENT DOCUMENTS 2128903  5/1984  United Kingdom .
2176719  6/1985  United Kingdom .

Primary Examiner—Charles Hart
Attorney, Agent, or Firm—Ernestine C. Bartlett

[57] ABSTRACT

A dust separator (1, 2) is provided for removing particles from a gas, provided with a centrifuge (3) which is rotatable about a central axis and which comprises at least two centrifuge chambers (7, 9). A first centrifuge chamber (7) is connected at one side to a gas inlet (11) and an opposing other side to a gas reversal chamber (13) which in its turn is connected to a second centrifuge chamber (9) which comprises a filter (17) and which concentrically surrounds the first centrifuge chamber (7).

14 Claims, 2 Drawing Sheets

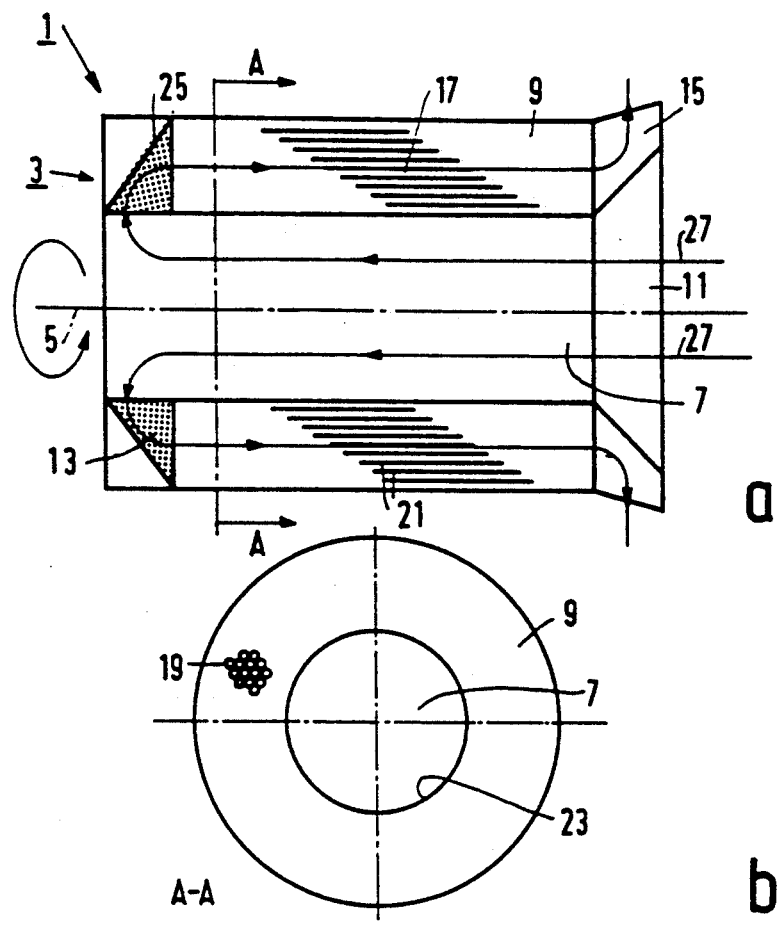
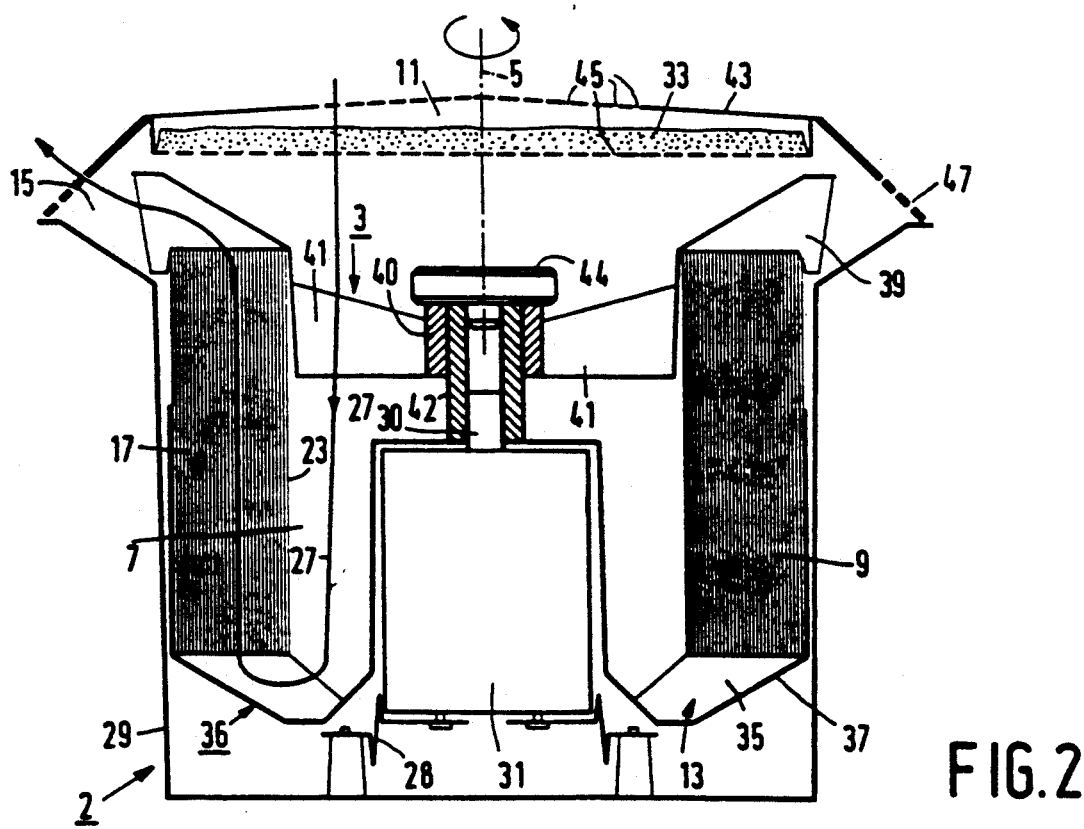

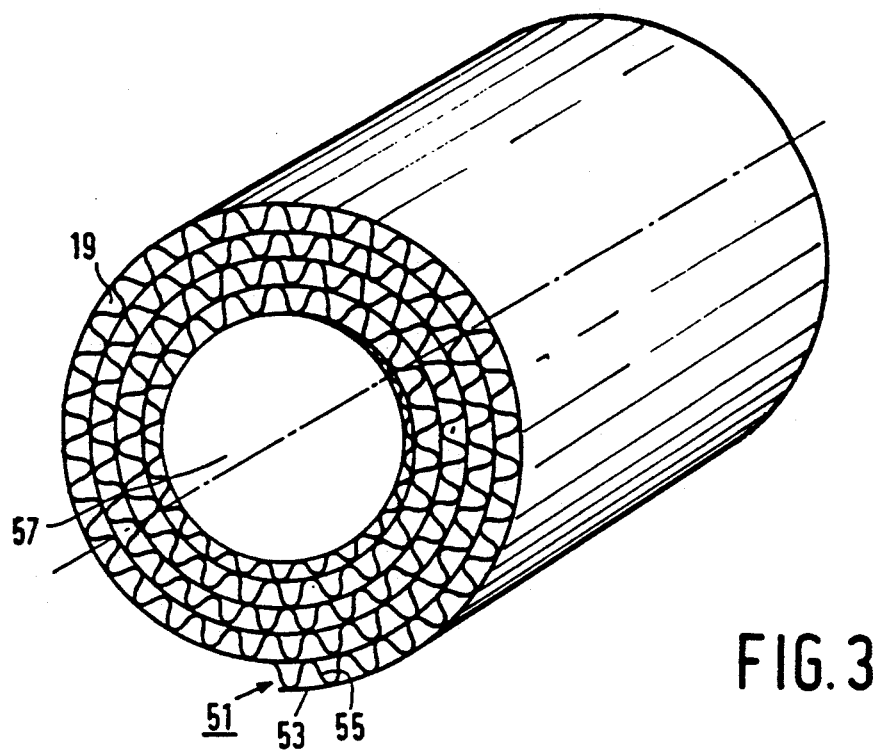
FIG.3
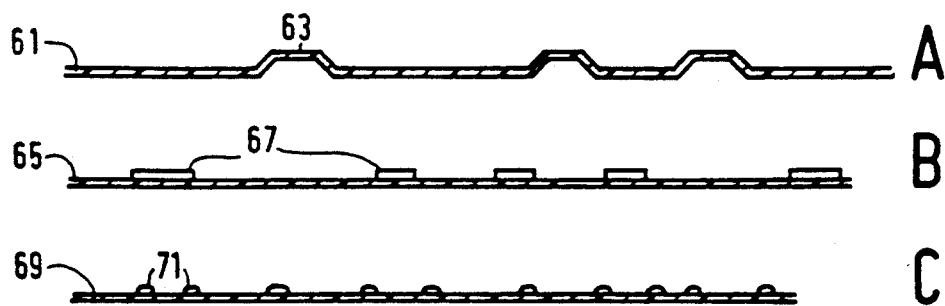
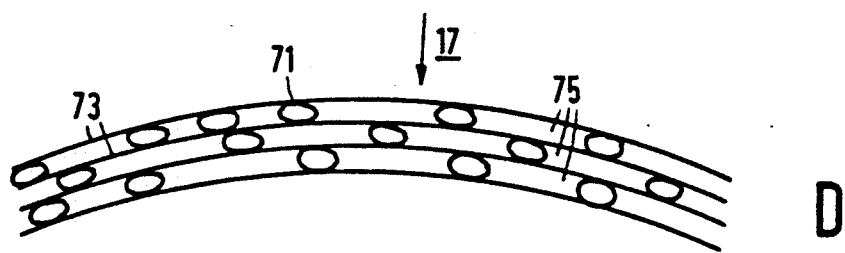
FIG.4

DUST SEPARATOR AND FILTER SUITABLE FOR USE IN SUCH A DUST SEPARATOR

FIELD OF THE INVENTION

The invention relates to a dust separator for separating particles from a gas, provided with a centrifuge which is rotatable about a central axis and which comprises a filter, and with a gas inlet and a gas outlet which are situated upstream and downstream of the centrifuge, respectively, seen in a gas flow direction. The invention also relates to a filter suitable for use in such a dust separator.

BACKGROUND OF THE INVENTION

Such a dust separator is known from European Patent EP-B1 0286160. In this known dust separator, a filter is rotated about a central axis. The filter is provided with channels whose walls extend parallel to the central axis.

Gas, for example air, which is polluted with liquid or solid particles having a diameter of 0.1 to 5 $\mu$m, is guided in axial direction into the channels of the filter through a gas inlet. A force in axial direction acts on the dust particles as a result of the gas flow, as well as a centrifugal force in radial direction as a result of the filter rotation. The centrifugal force presses the dust particles against the walls of the filter. At a side of the filter remote from the gas inlet, the gas is guided from the dust separator through a gas outlet. Dust particles larger than 10 $\mu$m are removed from the gas beforehand.

A disadvantage of the known dust separator is that a separate device is used for the removal of coarser dust particles (larger than 10 $\mu$m). Another disadvantage of the known dust separator is that the filter does not work effectively at a comparatively small radial distance from the central axis since the centrifugal force acting on the particles there is small.

SUMMARY OF THE INVENTION

The invention has for its object to provide a compact dust separator with which the disadvantages of the known dust separator are avoided and which is suitable for removing dust particles of widely differing dimensions.

According to the invention, this object is achieved in that the centrifuge comprises at least two centrifuge chambers, a first centrifuge chamber being connected to a gas inlet at one side and at an opposing other side to a gas reversal chamber which is furthermore connected to a second centrifuge chamber which contains the filter and which concentrically surrounds the first centrifuge chamber.

In the first centrifuge chamber, the larger and heavier particles are propelled from the gas by the centrifugal force against walls of the first centrifuge chamber which extend parallel to the central axis. These walls may be walls of the filter arranged around the first centrifuge chamber or walls of a drum which encloses the first centrifuge chamber and which can rotate in conjunction with the filter. The smaller dust particles experience a smaller centrifugal force owing to their smaller dimensions and mass, which force is insufficient for pressing the dust particles against the walls before these particles have passed through the first centrifuge chamber together with the gas. These dust particles leave the first centrifuge chamber with the gas through a side remote from the gas inlet. The gas flow is reverted in axial direction in the gas reversal chamber and guided into the filter of the second centrifuge chamber. The walls of the filter have such an interspacing that a laminar flow arises in the filter. The filter is situated at a greater radial distance away from the central axis than the walls of the first centrifuge chamber, and the centrifugal forces exerted on the dust particles are accordingly greater. Since the gas flow between the walls is laminar, the smaller particles are also pressed against the walls of the filter by the centrifugal force before the gas has passed through the filter.

A compact dust separator is obtained by the concentric arrangement of the centrifuge chambers.

Since the gas outlet is situated at a greater diameter than the gas inlet, the centrifuge rotation automatically sucks gas into the first centrifuge chamber and blows it from the dust separator through the second centrifuge chamber.

An embodiment of the dust separator according to the invention is characterized in that the gas reversal chamber is provided with gas-guiding means which are rotatable together with the centrifuge. The gas-guiding means, which comprise a ring of blades or a ring of a porous material, promote the reversal of the gas flow, the distribution of the gas over the filter, the introduction of the gas into the filter, and the generation of a laminar flow.

A further embodiment of the dust separator according to the invention is characterized in that the filter is manufactured from wound corrugated board, the channels present in the corrugated board extending parallel to the central axis. By corrugated board is meant in this connection a flat cardboard carrier plate with a corrugated cardboard plate fastened to it. Such a filter can be manufactured in a simple and inexpensive manner.

Another embodiment of the dust separator according to the invention is characterized in that the filter is manufactured from wound foil, a first winding being kept at a distance from a second winding by means of random unevennesses of the foil, while passages are present between the first and the second winding and the unevennesses, which passages extend at least in axial direction. The foil may be made of paper, synthetic material, or metal. The passages have an irregular cross-section owing to the random unevennesses and also run partly tangentially. The filter can be manufactured in a simple and inexpensive manner in that relief patterns or granules are provided in the foil.

A yet further embodiment of the dust separator according to the invention is characterized in that the unevennesses form part of carbon granules provided on the foil. The carbon granules serve to space the windings of the filter apart and to absorb undesirable gases in the gas to be filtered. In this manner, for example, air may be freed from undesirable smells and noxious gases.

BRIEF DESCRIPTION OF THE DRAWINGS

The invention will be explained in more detail with reference to the drawing in which:

FIGS. 1a and 1b diagrammatically show a first embodiment of a dust separator according to the invention in lateral elevation and in cross-section, FIG. 2 diagrammatically shows a second embodiment of a dust separator according to the invention, FIG. 3 shows a first embodiment of a filter according to the invention, and FIG. 4 shows alternative embodiments of filters according to the invention.

DETAILED DESCRIPTION OF PREFERRED EMBODIMENTS

FIG. 1a shows a dust separator 1 which is provided with a centrifuge 3 which can be rotated about a central axis 5 in a housing by means of a motor. The motor and the housing have not been shown for the sake of simplicity. The centrifuge 3 comprises a first centrifuge chamber 7 and a second centrifuge chamber 9 which is concentrically arranged around the first centrifuge chamber 7. The first centrifuge chamber 7 at one side merges into a gas inlet 11 and at another side into a gas reversal chamber 13. The gas reversal chamber 13 in its turn merges into one side of the second centrifuge chamber 9 which at another side merges into a gas outlet 15. The second centrifuge chamber 9 comprises a filter 17 which is provided with channels 19 with walls 21 which extend parallel to the central axis 5. The channels 19 have a circular cross-section. The wall 23 of the filter 17 is at the same time a wall of the first centrifuge chamber 7. A ring 25 of porous material is present in the gas reversal chamber 13. The function of this ring 25 will be explained further below.

The operation of the dust separator 1 is now briefly explained. The motor (not shown) rotates the centrifuge 3 about the central axis 5 with a speed of, for example, 2,000 rpm. Air is propelled from the gas outlet 15, as a result of which gas, for example air, is sucked into the first centrifuge chamber 7 through the gas inlet 11, which is situated at a smaller diameter than the gas outlet 15. The air is carried along with the wall 23 in the centrifuge chamber 7 and made to rotate, so that the dust particles present in the air are subjected to a centrifugal force and are moved towards the wall 23. When a dust particle reaches the wall 23, it remains pressed against this wall 23. The value of the centrifugal force depends inter alia on the mass of the dust particles. Light dust particles experience a smaller centrifugal force and most of the light dust particles will not yet have reached the wall 23 before the dust particles carried along by the air flow 27 reach the side of the first centrifuge chamber 7 remote from the gas inlet 11. The air flow 27 passes through the porous ring 25, which reduces turbulences in the air flow 27, and is then deflected into the opposite direction in the gas reversal chamber 13 and guided into the filter 17 of the second centrifuge chamber 9. The interspacing of the walls 21 of the filter 17 is so chosen, in combination with the type of gas and the average axial gas flowrate, that a laminar gas flow arises in the channels 19. A laminar flow is obtained when the Reynolds number is smaller than 2400. The Reynolds number $R_e$ is given by:

$$R_e = \frac{VD}{v}$$

in which:
V: the average axial velocity of the gas,
D: the hydraulic diameter of the channel
v: the kinematic viscosity of the gas.
The hydraulic diameter D is a characteristic dimension for the cross-section of the channel. The hydraulic diameter is equal to the diameter of the channel in the case of a circular cross-section. The laminar flow in the channels 19 prevents dust particles lying against the walls 21 from being carried along again by the air flow 27. This is in contrast to a turbulent flow, in which turbulences are capable of detaching particles from the wall. The air flow 27 leaves the dust separator through the gas outlet 15 at the end of the filter 17. When the dust separator 1 is switched off, the dust particles continue to stick against the wall 23 and the walls 21. It is assumed that this is caused by mutual adhesion of the particles and of the particles to the wall 23 and/or by van der Waals forces among the particles and between the particles and the wall. The filter 17 may be cleaned or replaced when it is no longer sufficiently effective.

FIG. 1b shows a cross-section in the plane A—A of the dust separator 1 according to FIG. 1a. The cross-section of a channel may be rectangular or annular instead of circular, or may have any other shape.

FIG. 2 shows an alternative embodiment of a dust separator according to the invention. The parts corresponding to those of FIG. 1 are given the same reference numerals. The dust separator 2 comprises a housing 29 in which the centrifuge 3 is accommodated. The centrifuge 3 is driven by a motor 31 which is connected to the housing 29 by means of a resilient fastening 28. The resilient fastening 28 corresponds to a suspension which is known from centrifuges for the removal of water from laundry. The centrifuge 3 is fastened on an output shaft 30 of the motor 31 by known means. The gas inlet 11 is provided with a filter 33 which removes coarse dust particles such as, for example, hairs from the air. The gas reversal chamber 13 is provided with a blade ring 36 fitted with blades 35 which promotes the suction of air into the dust separator 2 and also reduces turbulences in the air flow, so that a laminar gas flow in the filter 17 is promoted. The blades 35 are connected to and rotate along with a wall 37 of the centrifuge 3. The flat blades 35 extend in radial direction, the blade surfaces being parallel to the central axis 5. At a greater radial distance from the central axis, the quantity of air to be guided by the blades 35 is smaller than at a smaller radial distance, since at the greater radial distance a portion of the air flow has already been guided into the filter 17. The dimension of the blades 35 in axial direction is adapted to the quantity of air to be displaced, and is accordingly smaller at a greater radial distance. This promotes an even distribution of the air flow over the filter. Blades 39 are present at the side of the filter 17 facing the gas outlet 15, helping the air to flow out. The blades 39 are connected to a bush 40 by means of a number of plates 41, which bush is passed around a portion 42 of the centrifuge 3 and is detachably connected thereto by means of a bolt 44. The housing 29 is provided with a detachable lid 43 which has central openings 45 at the gas inlet 11 and openings 47 at the gas outlet 15. The filter 33 is present in the lid 43. When the lid 43 is removed from the housing and the bolt 42 is loosened, the blades 39 with the plates 41 may be taken as an integral unit from the centrifuge 3. The filter 17 may then be removed from the centrifuge 3. The filter 17 may be cleaned or replaced by a clean filter. The dust separator 2 is of a simple construction and may be readily provided with a clean filter.

A dust separator 2 having a filter 17 with an external diameter of 24 cm, an internal diameter of 15 cm, an axial length of 25 cm and channels 19 with a diameter of 0.5 to 3 mm, which was rotated at a speed of 2,000 rpm was found to be suitable for purifying 200 m³ air/hour, whereby dust particles having a cross-section down to 0.1 µm were removed from the gas.

FIG. 3 shows an embodiment of a filter 17 according to the invention. A strip of corrugated board 51 which comprises a flat cardboard carrier plate 53 and a corrugated cardboard plate 55 attached thereto is wound around a core 57 until the diameter corresponds to the desired external diameter of the filter 17. The core 57 has a diameter corresponding to the desired internal diameter of the filter 17. The channels 19 present in the corrugated board 51 extend parallel to the core 57. Instead of a core 57, a thin-walled pipe may alternatively be used, which after winding of the corrugated board around the pipe will form part of the filter. FIGS. 4a, 4b and 4c show three different strips of material from which filters are wound.

FIG. 4a shows a paper foil 61 in which relief patterns are provided, for example, by moulding or creasing. When the foil 61 is rolled around the core 57, the windings are kept at a distance from one another by the projections in the relief pattern. Wall paper provided with a relief was found to be suitable as a foil for a filter 17. Such a filter is cheap, easy to manufacture and to replace, and environment-friendly.

FIG. 4b shows a foil 65 made of aluminum on which granules 67 of any composition (for example, wood chips or plastic) are fastened. The granules 67 keep the consecutive windings of the foil 65 at a distance from one another. The size of the granules 67 depends on the desired interspacing between the windings. In a dust separator according to the invention, the granule diameter was at most 4 mm. The thickness of the foil should be as small as possible (0.1 to 1 mm). No clearly defined channels are formed in the filter by the granules 67, but passages are created in axial direction through the filter which also partly run in tangential direction. Wall paper provided with embedded particles is also suitable as a foil.

FIGS. 4c and 4d show a plastic foil 69 on which carbon granules 71 are provided. Such a foil is suitable for a filter 17 which is used for the removal of an undesirable smell from a gas. A smell is mainly caused by a small quantity of a gas mixed in a different gas which is present in a greater quantity. The carbon granules 71 absorb the undesirable gas and also keep the different windings 73 of the foil in the filter at a distance from one another. Passages 75 which extend in axial direction are present between the carbon granules 71 and the windings 73.

It is possible to provide the dust separator with a third centrifuge chamber which is situated around the second centrifuge chamber and is connected thereto via a second gas reversal chamber. The third centrifuge chamber may be provided with a filter having channels which are smaller than the channels in the filter of the second centrifuge chamber in order to obtain a still better filtering action.

The blades of the blade ring may alternatively be curved or enclose an angle with the radial planes.

We claim:

1. A dust separator for separating particles from a gas, provided with a centrifuge which is rotatable about a central axis and which comprises a filter, and with a gas inlet and a gas outlet which are situated upstream and downstream of the centrifuge, respectively, seen in a gas flow direction. Wherein the centrifuge comprises at least two centrifuge chambers, a first centrifuge chamber being connected to a gas inlet at one side and at an opposing other side to a gas reversal chamber which is connected to a second centrifuge chamber which contains the filter and which concentrically surrounds the first centrifuge chamber.

2. A dust separator as claimed in claim 1, wherein the gas reversal chamber is provided with gas-guiding means which are rotatable together with the centrifuge.

3. A dust separator as claimed in claim 2, wherein the gas-guiding means comprise a ring of blades.

4. A dust separator as claimed in claim 2, wherein the gas-guiding means comprise a ring of porous material.

5. A dust separator as claimed in claim 1, wherein the filter is manufactured from wound corrugated board, the channels present in the corrugated board extending parallel to the central axis.

6. A dust separator as claimed in claim 1, wherein the filter is manufactured from wound foil, a first winding being kept at a distance from a second winding by means of random unevennesses on the foil, while passages are present between the first and the second winding and the unevennesses, which passages extend at least in axial direction.

7. A dust separator as claimed in claim 6, wherein the unevennesses form part of relief patterns provided in the foil.

8. A dust separator as claimed in claim 6, wherein the unevennesses form part of granules embedded in the foil.

9. A dust separator as claimed in claim 6, wherein the unevennesses form part of carbon granules provided on the foil.

10. A filter suitable for use in a dust separator as claimed in claim 5.

11. A filter suitable for use in a dust separator as claimed in claim 6.

12. A filter suitable for use in a dust separator as claimed in claim 7.

13. A filter suitable for use in a dust separator as claimed in claim 8.

14. A filter suitable for use in a dust separator as claimed in claim 9.

* * * * *